(12) United States Patent
Shin et al.

(10) Patent No.: US 6,957,085 B2
(45) Date of Patent: Oct. 18, 2005

(54) INTERNAL DISPLAY-MOUNTED ANTENNA FOR MOBILE ELECTRONIC EQUIPMENT AND MOBILE ELECTRONIC EQUIPMENT INCORPORATING SAME

(76) Inventors: Hyo Sik Shin, Sunkyong 3-cha Apt. 302-401, 159, Ingye-Dong, Paldal-Gu, Suwon, Gyeonggi-Do (KR); Kwang Seog Bang, Kunyoung Apt. 108-702, 591-2, Ichung-Dong, Pyeongtaek, Gyeonggi-Do (KR); Eung Bok Kim, Shinsung Apt. 201-702, 134-10, Dunchon 2-Dong, Gangdong-Gu, Seoul (KR)

( * ) Notice: Subject to any disclaimer, the term of this patent is extended or adjusted under 35 U.S.C. 154(b) by 539 days.

(21) Appl. No.: 10/036,545

(22) Filed: Jan. 7, 2002

(65) Prior Publication Data

US 2002/0151328 A1 Oct. 17, 2002

(30) Foreign Application Priority Data

Apr. 11, 2001  (KR) .......................................... 2001-19281
Jun. 15, 2001  (KR) .......................................... 2001-33952

(51) Int. Cl.$^7$ .......................... H04M 1/00; H04B 1/38
(52) U.S. Cl. ................. 455/557; 455/556.1; 455/575.1; 455/575.3; 455/575.7
(58) Field of Search .......................... 455/575.1, 575.8, 455/559, 90.3, 557.1, 575.3, 575.5, 575.7, 556.1, 556.2, 557; 343/702, 725, 795, 864, 869, 871, 872, 873

(56) References Cited

U.S. PATENT DOCUMENTS

| | | | | |
|---|---|---|---|---|
| 4,497,036 A | * | 1/1985 | Dunn | 364/708 |
| 5,331,506 A | * | 7/1994 | Nakajima | 361/683 |
| 5,365,246 A | | 11/1994 | Rasinger et al. | 343/702 |
| 5,644,319 A | * | 7/1997 | Chen et al. | 343/702 |
| 5,684,672 A | | 11/1997 | Karidis et al. | 361/683 |
| 5,809,403 A | * | 9/1998 | MacDonald, Jr. et al. | 455/575 |
| 5,886,669 A | * | 3/1999 | Kita | 343/718 |
| 5,914,690 A | * | 6/1999 | Lehtola et al. | 343/702 |
| 6,100,850 A | | 8/2000 | Utsumi | 343/702 |
| 6,133,883 A | * | 10/2000 | Munson et al. | 343/700 |
| 6,181,284 B1 | | 1/2001 | Madsen et al. | 343/702 |
| 6,212,067 B1 | * | 4/2001 | Nakajima et al. | 361/681 |
| 6,339,400 B1 | * | 1/2002 | Flint et al. | 343/702 |
| 6,362,792 B1 | * | 3/2002 | Sawamura et al. | 343/702 |
| 6,385,037 B2 | * | 5/2002 | Howell et al. | 361/683 |
| 6,441,791 B1 | * | 8/2002 | Oka | 343/713 |
| 6,477,871 B1 | * | 11/2002 | Shaw et al. | 70/58 |
| 2002/0021250 A1 | | 2/2002 | Asano et al. | 343/702 |
| 2003/0161093 A1 | * | 8/2003 | Lam et al. | 361/681 |

FOREIGN PATENT DOCUMENTS

| | | |
|---|---|---|
| EP | 0543645 | 5/1993 |
| EP | 0484454 | 9/1994 |
| EP | 1079296 | 7/2000 |
| KR | 10-1997-0028939 | 6/1997 |
| KR | 10-1997-0062858 | 9/1997 |
| KR | 10-1998-0041789 | 8/1998 |

* cited by examiner

Primary Examiner—William Trost
Assistant Examiner—Meless Zewdu
(74) Attorney, Agent, or Firm—Fleshner & Kim, LLC

(57) ABSTRACT

A mobile electronic equipment with an internal antenna includes a case with a opened portion, a display panel exposed through the opened portion of the case for displaying a character or image information, a panel frame made of metal to support the edges of the display panel and being positioned within the case, and an antenna for enabling a data transmission and reception for a radio communication. The antenna is grounded to the panel frame in a state of being positioned within the case. The antenna is fixed to the panel frame with a bracket for fixing the display panel to the case. The antenna of the mobile electronic equipment is positioned in the portable electronic equipment such as the PDA or the portable computer and data transmission and reception is possibly performed for a radio communication without being exposed outwardly. Thus, the problem that a user should handle the antenna directly can be solved, and the antenna can be prevented from damage possibly caused due to a wrong use.

48 Claims, 9 Drawing Sheets

INTERNAL DISPLAY-MOUNTED ANTENNA FOR MOBILE ELECTRONIC EQUIPMENT AND MOBILE ELECTRONIC EQUIPMENT INCORPORATING SAME

BACKGROUND OF THE INVENTION

1. Field of the Invention

The present invention relates generally to a mobile electronic equipment such as a portable computer called a palmtop or a laptop or a notebook computer, or a portable terminal called a PDA (Personal Digital Assistant), and more particularly, to an internal antenna structure for such mobile electronic equipment and to mobile electronic equipment incorporating the antenna.

2. Description of the Background Art

A mobile electronic equipment is operated by power supplied from a compact portable battery and types of such devices include a portable terminal such as a PDA, a palmtop computer or a laptop computer or a notebook computer.

Research has been ongoing to make the mobile electronic equipment more compact and lighter-weight and to have a multifunctional capacity, and also for making it possible to radio-frequency communicate by radio with an external instrument.

Especially, there have been introduced data communication devices which transmit or receive data wirelessly between a desktop computer or a server, or to enable a LAN card or a modem card inserted in a main body and an external instrument to communicate with each other wirelessly without using a connecting cable to access a network.

In order to adopt the radio communication to the mobile electronic equipment, it is requisite to adopt a high efficiency antenna. But, notably, there are inconvenient aspects and restrictions in designing such an antenna and in its adaptation to the mobile electronic equipment due to the special requirement that it should be mounted for use in a compact mobile electronic equipment.

For one example, a conventional antenna structure has been proposed in which a pull-up type rod antenna is mounted within a main body of the mobile electronic equipment and pulled out therefrom for use in a radio communication.

Such antenna, however, has a problem that since a rod of the antenna remains exposed outside the main body, designing of the outer case is not easy and an elegant appearance would be hardly accomplished, and furthermore a space is required to install the antenna therein, resulting in that the size of the product is increased.

For another example, U.S. Pat. No. 6,181,284 entitled 'antenna for portable computer' by Madsen et al. discloses an antenna which is installed to be bent at one upper side of a main body of a computer. In this patent, the antenna is received in a storage portion formed in the vicinity of the antenna when the computer is not in a use, while when the computer is desired to be used, a display case of the computer is stood upright and the antenna is stood vertically from the storage portion for communicating.

However, because the antenna of Madsen et al. protrudes vertically from the case when in use, there is a risk that it can be damaged due to a user's inadvertence.

For still another example, U.S. Pat. No. 5,684,672 entitled 'Laptop computer with an integrated multi-mode antenna' by Karidis et al. discloses a multi-mode type whip antenna installed at one inner side of a display case of a computer.

However, the antenna of Karidis et al. has such a construction that it is withdrawn to be extended from the display case for the purpose of obtaining the maximum efficiency when it is in use, while it is drawn back for a firmness and convenience when it is not in use. Thus, when the antenna is withdrawn for use, it could be caught by a person or other objects and damaged.

To sum up, the portable computer, a kind of mobile electronic equipment, according to the conventional art has the following problems.

That is, those antennas are constructed to be exposed outwardly of the computer main body or the case when it is in use. Thus, when a user desired to use the antenna for a radio communication, he or she must directly operate the antenna to be exposed. In addition, while the user is using the computer with the antenna exposed, there is a high risk that the antenna could be damaged.

SUMMARY OF THE INVENTION

Therefore, an object of the present invention is to provide an antenna for radio communication which is installed within a case so as to be protected from damage from an external interference, and a mobile electronic equipment with the antenna.

Another object of the present invention is to provide an antenna for radio communication which is installed to be electrically connected to a panel frame supporting a display in a state of being positioned within the case so that a wider grounding area is obtained and a transmitting and receiving efficiency can be heightened even without manipulation of the antenna by a user, and a mobile electronic equipment with the antenna.

Still another object of the present invention is to provide an antenna for radio communication installed at both sides of a display panel not to increase the size of its product, and a mobile electronic equipment with the antenna.

To achieve these and other advantages and in accordance with the purpose of the present invention, as embodied and broadly described herein, there is provided the mobile electronic equipment with an antenna including a case with an opened portion, a display panel exposed through the opened portion of the case for displaying a text or image information, a panel frame made of a metal to support the edges of the display panel, and being positioned within the case, and an antenna for enabling a data transmission and reception for a radio communication and being grounded to the panel frame in a state of being inserted in the case.

In the mobile electronic equipment with an antenna of the present invention, antennas may be attached to the panel frame at both lateral sides of the display panel.

In the mobile electronic equipment with an antenna of the present invention, the antenna includes a grounding portion attached to the panel frame, a cable fixing portion positioned in parallel with and spaced from the grounding portion, and a connecting portion connecting the grounding portion and the cable fixing portion.

In the mobile electronic equipment with an antenna of the present invention, the antenna is formed by bending a metal plate with in a 'U' shape, and the grounding portion, the connecting portion and the cable fixing portion are integrally formed.

In the mobile electronic equipment with an antenna of the present invention, a bracket is provided to fix the panel frame to the case, and part of the antenna is inserted and grounded between the bracket and the panel frame.

In the mobile electronic equipment with an antenna of the present invention, a bracket is provided to fix the panel frame to the case, which is made of a metal and is adhered closely to the panel frame, and the antenna is fixed at one side of the bracket.

In the mobile electronic equipment with an antenna of the present invention, the bracket includes an antenna fixing portion protruded in an 'L' shape from the portion closely adhered to the panel frame, so that the antenna can be fixed.

In the mobile electronic equipment with an antenna of the present invention, the antenna is formed in a long plate form and attached at the antenna fixing portion.

To achieve the above objects, there is further provided an antenna for radio communication installed inserted in mobile electronic equipment, including: a grounding portion for being grounded to a metal member in mobile electronic equipment; a cable fixing portion positioned in parallel with and spaced from the grounding portion and being electrically connected to the end of a cable connected to a communication control device; and a connecting portion connecting the grounding portion and the cable fixing portion.

The antenna of the present invention is formed of a metal plate bent in a 'U'-shape and the grounding portion, the connecting portion and the cable fixing portion are integrally formed.

In the antenna of the present invention, the cable fixing portion includes a transmitting and receiving portion extended from one edge thereof in the longitudinal direction.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
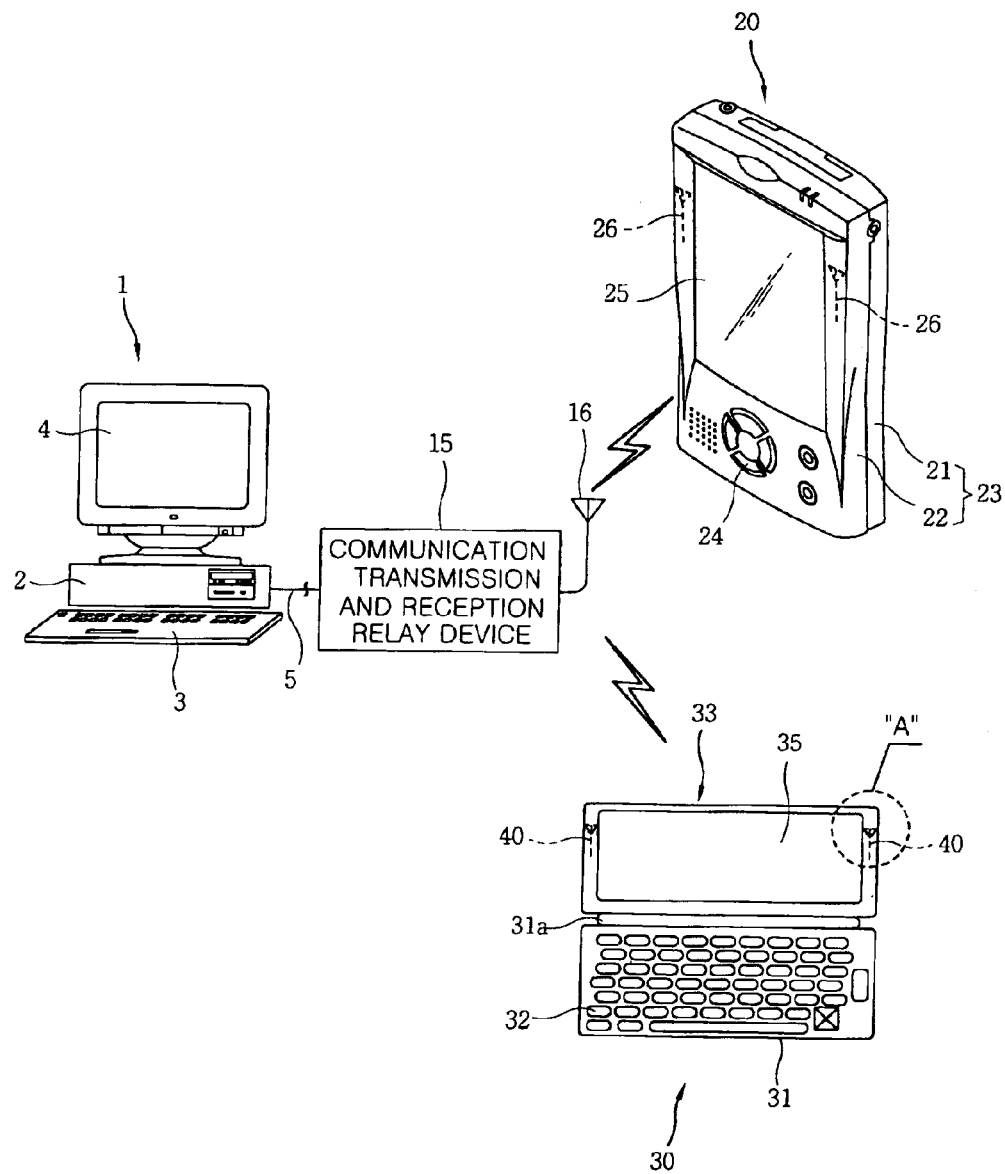
FIG. 1 is a schematic view showing a radio communication state between two PDAs, a kind of mobile electronic equipment with an antenna, and a desktop computer in accordance with a first embodiment of the present invention.

FIG. 1 is a schematic view showing a radio communication state between two PDAs, a kind of mobile electronic equipment with an antenna, and a desktop computer or a server in accordance with a first embodiment of the present invention;

With reference to FIG. 1, a desktop computer 1 includes a main body 2 having a CPU and a modem or the like and a key board 3 and a monitor 4 connected to the main body 2. The desktop computer 1 is connected to a communication transmission and reception relay device 15 through a cable 5 connected to the main body 2, so that a wired or a wireless communication is possibly performed.

Antennas 26 and 40 of the present invention are respectively installed within two types of PDAs 20 and 30, a kind of mobile electronic equipment.

The mobile electronic equipment is a general term known as a PDA, a palmtop computer or a laptop computer or a notebook computer, and two types of PDAs 20 and 30 are shown in FIG. 1.

First, as for the first PDA 20, a display unit 25 is integrally installed in a main body 23 which is constituted by assembling a lower case 21 and an upper case 22, in which a CPU and a communication control device are installed within the main body 23.

The lower case 21 supports the display unit 25, and the display unit 25 is exposed at an upper surface of the upper case 22, so that a user can view character or image information displayed on the display unit 25.

A plurality of input keys 24 are installed at the upper case 25 so as for the user to operate the PDA.

Especially, antennas 26 (to be described) are installed at both sides of the display unit 25, and the antennas are connected to the communication control device.

The second PDA 30 includes a main body 31 with a plurality of input keys 32 installed at an upper surface thereof and having a CPU for processing various data and the communication control device, and a display case 33 rotatably connected by a hinge 31a from the rear side of the main body 31 so as to be folded to the main body 31 or unfolded from the main body 31.

The display case 33 includes a display unit 35 on which character or image information is displayed, and antennas 40 installed at both sides of the display unit 35.

Although the antennas 26 and 40 are shown installed at both sides of the display units 25 and 35 of the first and the second PDAs 20 and 30, they may be installed only at one side of the display unit according to a use or a designing condition.

Referring to the first or the second PDA 20 or 30, when data is transmitted wirelessly through the antennas 20 or 40, it is received by the desktop computer 1 through an antenna 16 of the communication transmission and reception relay device 15.

Conversely, data transmitted from the desktop computer 1 also can be received wirelessly through the antennas 26 or 40 of the first or the second PDA 20 or 30 after passing through the antenna 16 of the communication transmission and reception relay device 15.

In addition, data transmission and reception can be also possibly performed between the first PDA 20 and the second PDA 30 through each antenna 26 and 40 and the communication transmission and reception relay device 15.

The antenna in accordance with the first embodiment of the present invention will now be described with reference to FIGS. 2, 3 and 4.

Figure 2:
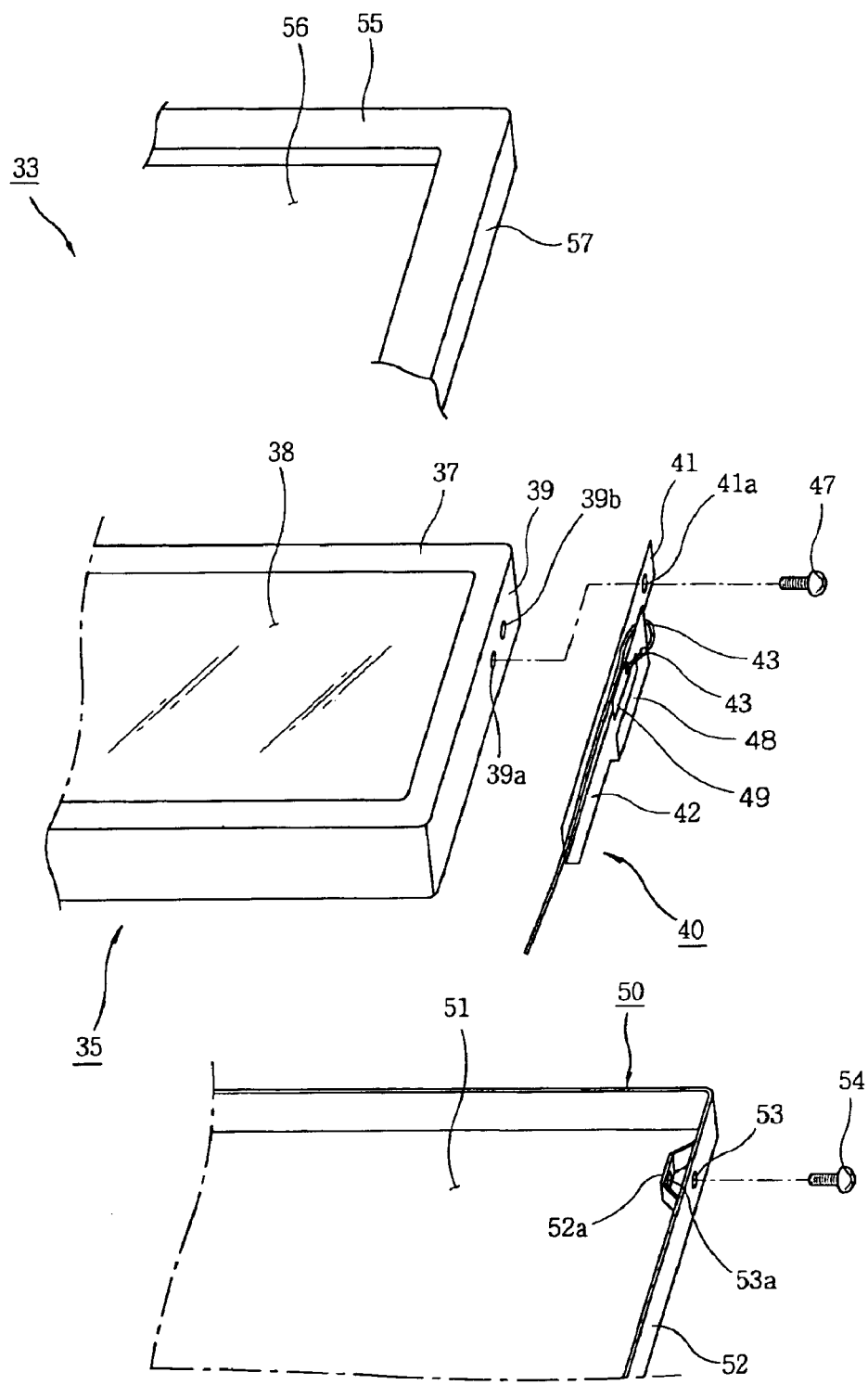
FIG. 2 is an exploded perspective view of a portion 'A' of the second PDA of FIG. 1 in accordance with the first embodiment of the present invention.

FIG. 2 is an exploded perspective view of a portion 'A' of the second PDA of FIG. 1 in accordance with the first embodiment of the present invention, showing how the antenna 40 is installed.

As a matter of course, as shown in FIG. 1, the antennas 26 of the portable terminal that the display unit 25 is integrally formed at the main body 23 such as the first PDA 20 has the same construction as that of FIG. 2.

FIG. 2 shows only a right side portion of the second PDA 30 for description, but if the antenna is installed at the left side, its structure would be the same.

The display case 33 of the second PDA 30 is constituted by assembling a lower case 50 and an upper case 55, in which the display unit 35 and the antenna 40 are installed.

The lower case 50 includes a bottom panel 51 supporting the display unit 35 and side walls 52 vertically bent from the edge portion of the bottom panel 51.

A screw hole 53 is formed in the right side wall 52 of the lower case 50, and a fixing bracket 52a is protruded inwardly from the right side walls at a position corresponding to the screw hole 53. A hole 53a is formed in the fixing bracket 52a corresponding to the screw hole 53.

The upper case 55 is formed in a square-rim shape, and a side wall 57 thereof is fixed to the lower case 50 in a manner of surrounding the display unit 35 to support the display unit 35, and an opening portion 56 is formed in the upper case 55 to expose a display panel 38 of the display unit 35.

The display unit 35 includes the display panel 38 and a panel frame 37 supporting and surrounding a portion of a side face, an upper face and a bottom face of the display panel 38 to prevent the display panel 38 from bending at an outer portion of the display panel 38.

The panel frame 37 is made of a metal to obtain a protection strength of the display panel 38, and two screw holes 39a and 39b are formed at a side wall 39 surrounding the side face of the display panel 38.

The antenna 40 is attached to the side wall 39 of the panel frame 37, having a construction that a grounding portion 41, a connecting portion 42, a cable fixing portion 48 and a transmitting and receiving portion 49 are press-formed to be bent in a 'U' shape.

A hole 41a is formed in an upper end portion of the grounding portion 41 so that the antenna 40 can be fixed by a screw 47 at the side wall 39 of the panel frame 37.

An end portion of a coaxial cable 43 connected from the communication control device (not shown) provided at the main body is electrically connected at the cable fixing portion 48 and the transmitting and receiving portion 49.

Figure 3:
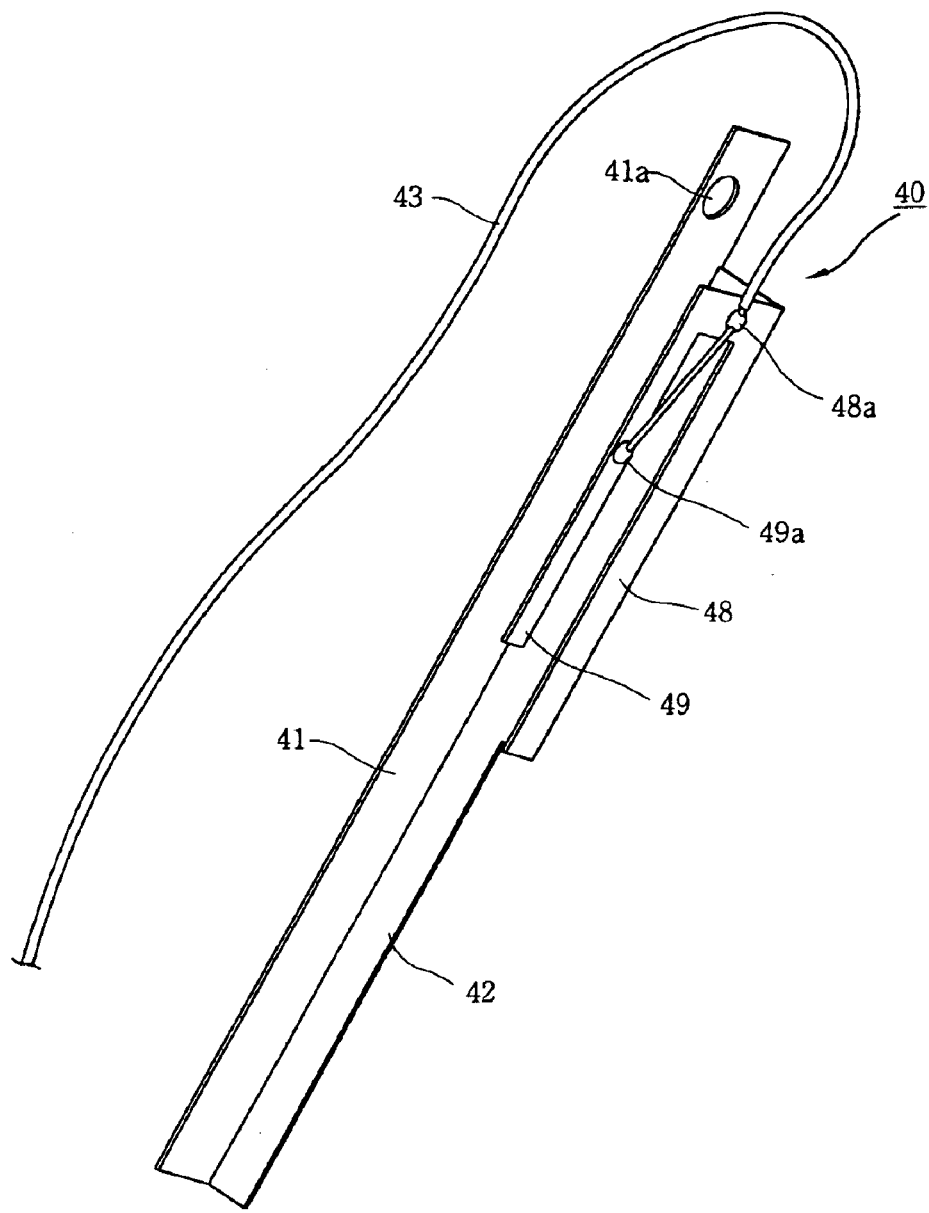
FIG. 3 is a detailed perspective view showing an antenna of FIG. 2 in accordance with the first embodiment of the present invention.
Figure 4:
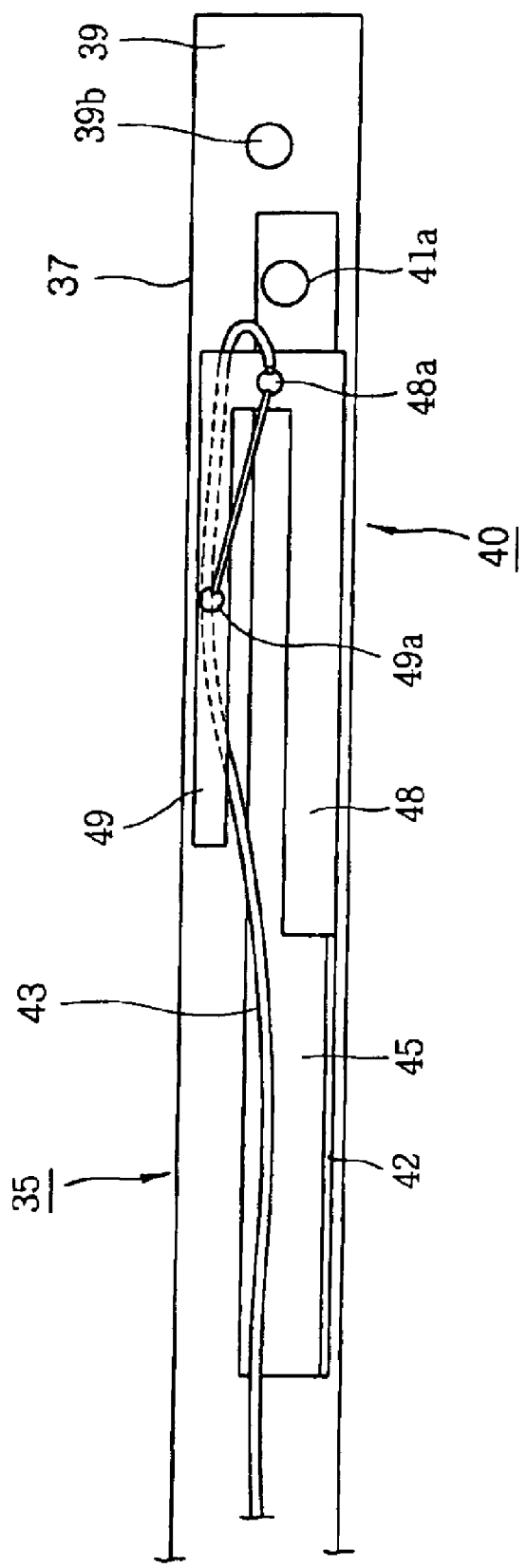
FIG. 4 is a side view showing a state that the antenna is fixed at a side wall of a display unit in accordance with the first embodiment of the present invention.

FIG. 3 is a detailed perspective view showing the antenna 40 of FIG. 2 in accordance with the first embodiment of the present invention, and FIG. 4 is a side view showing a state that the antenna 40 is fixed at the side wall 39 of the display unit 35 in accordance with the first embodiment of the present invention.

The antenna 40 of the first embodiment of the present invention includes the grounding portion 41 closely contacted to the side wall 39 of the panel frame 37, the connecting portion 42 perpendicularly bent to be extended from a side face of the grounding portion 41, and the cable fixing portion 48 bent perpendicularly from an outer edge portion of the connecting portion 42 and positioned in parallel with the grounding portion 41 with a predetermined space therebetween.

The transmitting and receiving portion 49 is formed in an 'L' shape with its short leg joined at the cable fixing portion 48, and with its long leg being extended long in the longitudinal direction of the antenna 40 from short leg spaced from and parallel to the cable fixing portion 48.

It is preferred that the width and the a length of the grounding portion 41 and the transmitting and receiving portion 49 are the same as or the smaller than the width and the length of the side wall 39 of the panel frame 37 so that the grounding portion 41 and the transmitting and receiving portion 49 may not be greater in width and length than the panel frame 37.

The antenna 40 is formed by press-forming a metal plate made of a phosphor bronze material and bending it in a 'U' shape, so that the grounding portion 41, the connecting portion 42, the cable fixing portion 48 and the transmitting and receiving portion 49 are integrally formed.

A center conductor wire of the coaxial cable 43 is electrically connected to a first junction portion 49a of the transmitting and receiving portion 49, and an external grounding shield conductor wire of the coaxial cable 43 is electrically connected to a second junction portion 48a of the cable fixing portion 48.

That is, the coaxial cable 43, connected to a LAN card, a communication control equipment of the main body 31 of FIG. 1, is connected to the cable fixing portion 48 and the transmitting and receiving portion 49 of the antenna 40. At this time, the center conductor wire positioned at the central portion of the coaxial cable 43 is connected to the first junction portion 49a of the transmitting and receiving portion 49 and the external grounding shield conductor formed around the center conductor wire is connected to the second junction portion 48a of the cable fixing portion 48.

The process of assembling the display case 33 in view of the antenna 40 will now be described with reference to FIGS. 1 through 4.

First, in a state that the screw fixing hole 39a in the panel frame 37 and the hole 41a in the antenna 40 are aligned with each other, the antenna 40 is fixed to the panel frame 37 with the screw 47. Thereby, the grounding portion 41 of the antenna 40 is closely contacted to the side wall 39 of the panel frame and fixed.

Next, a wiring operation is performed so that the coaxial cable 43 connected to the communication control circuit (not shown) of the main body 31 of FIG. 1 passes between the grounding portion 41 and the transmitting and receiving portion 49 of the antenna 40, and the center conductor and shield of the coaxial cable 43 are respectively connected and fixed at the cable fixing portion 48 and the transmitting and receiving portion 49.

And then, the display unit 35 with the antenna 40 fixed thereto is mounted into the lower case 50, as shown in FIG.

2, the panel frame 37 is guided to the fixing bracket 52a of the lower case 50 and mounted, and the screw hole 39b formed at the side wall 39 of the panel frame 37 is positioned corresponding to the hole 53a of the fixing bracket 52a.

In this state, the screw 54 is inserted into the screw holes 53 and 53a of the lower case 50 and engaged with the screw hole 39b of the panel frame 37, so that the display unit 35 can be firmly fixed to the lower case 50.

And, the upper case 55 is fixed at the upper portion of the display unit 35 fixed at the lower case 50. At this time, the side wall 57 of the upper case 55 is coupled and fixed with the side wall 52 of the lower case 50 by a hooking method or a screw fastening method.

Accordingly, the display unit 35 is fixed in the display case 33, and at the same time, the antenna 40 is closely contacted and positioned at one or both sides of the display unit 35.

Figure 5:
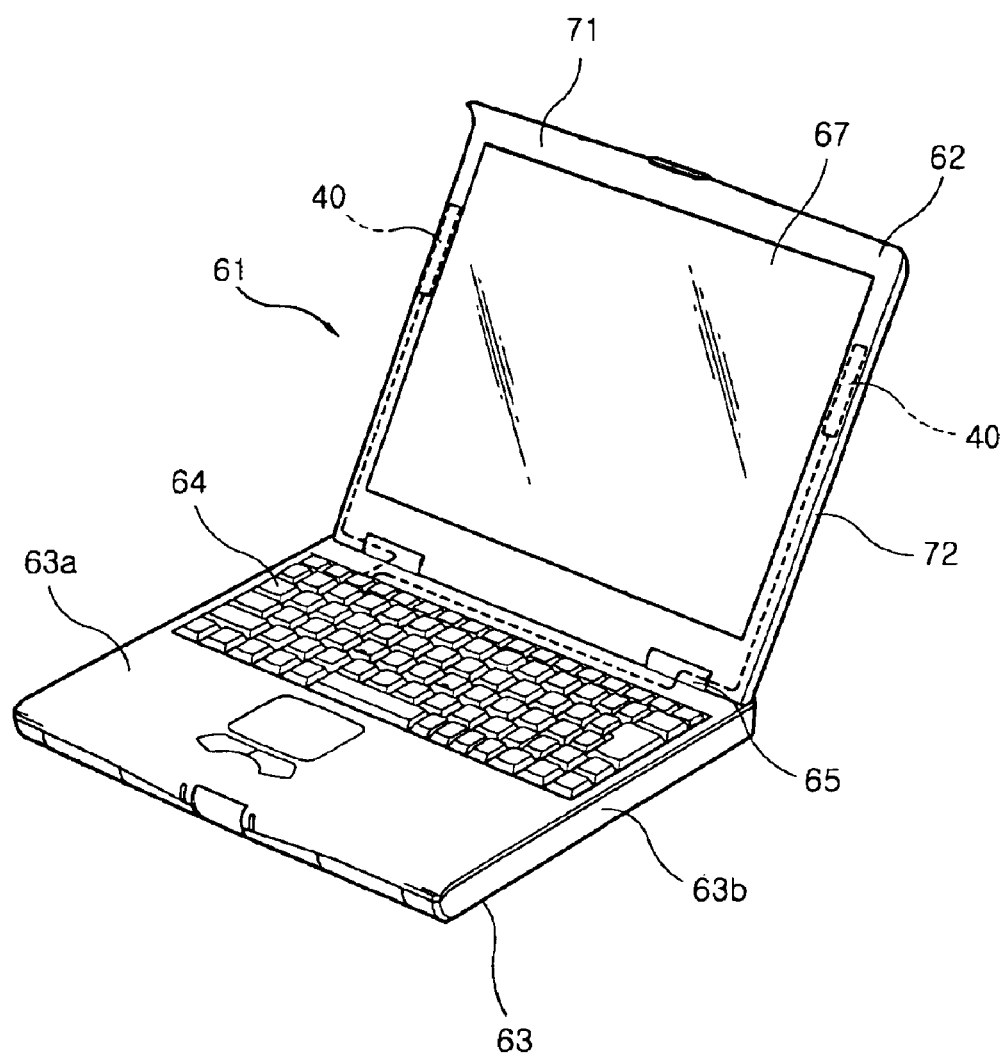
FIG. 5 is a perspective view showing a portable computer with an antenna in accordance with a second embodiment of the present invention.

FIG. 5 is a perspective view showing a portable computer with an antenna in accordance with a second embodiment of the present invention.

The portable computer 61 includes a main body 63 having an upper case 63a and a lower case 63b which are coupled together, and a keyboard 64 having a plurality of input keys for inputting information is installed at an upper surface of the upper case 63a.

In the main body 63 between the lower case 63b and the key board 64, there are provided a data storage device such as an optical disk drive or a hard disk, a printed circuit board with a CPU (not shown) installed, and a LAN card (not shown), a communication control device, for a radio frequency communication connected at one side of the printed circuit board.

A display unit 62 is installed at a rear side of the main body 63 by a hinge unit 65, so as to be folded to or unfolded from the main body 63 between a first position where a user can view the key board 64 and a second position where the user can not view the key board 64.

The display unit 62 includes a display panel 67 and two antennas 40 installed at both side faces of the display panel 67, for enabling a radio communication.

The display unit 62 is assembled of an inner case 71 which is coupled to the outer circumferential portion of an outer case 72, and the inner case 71 is opened so that the display panel 67 is exposed and the user can view it.

Figure 6:
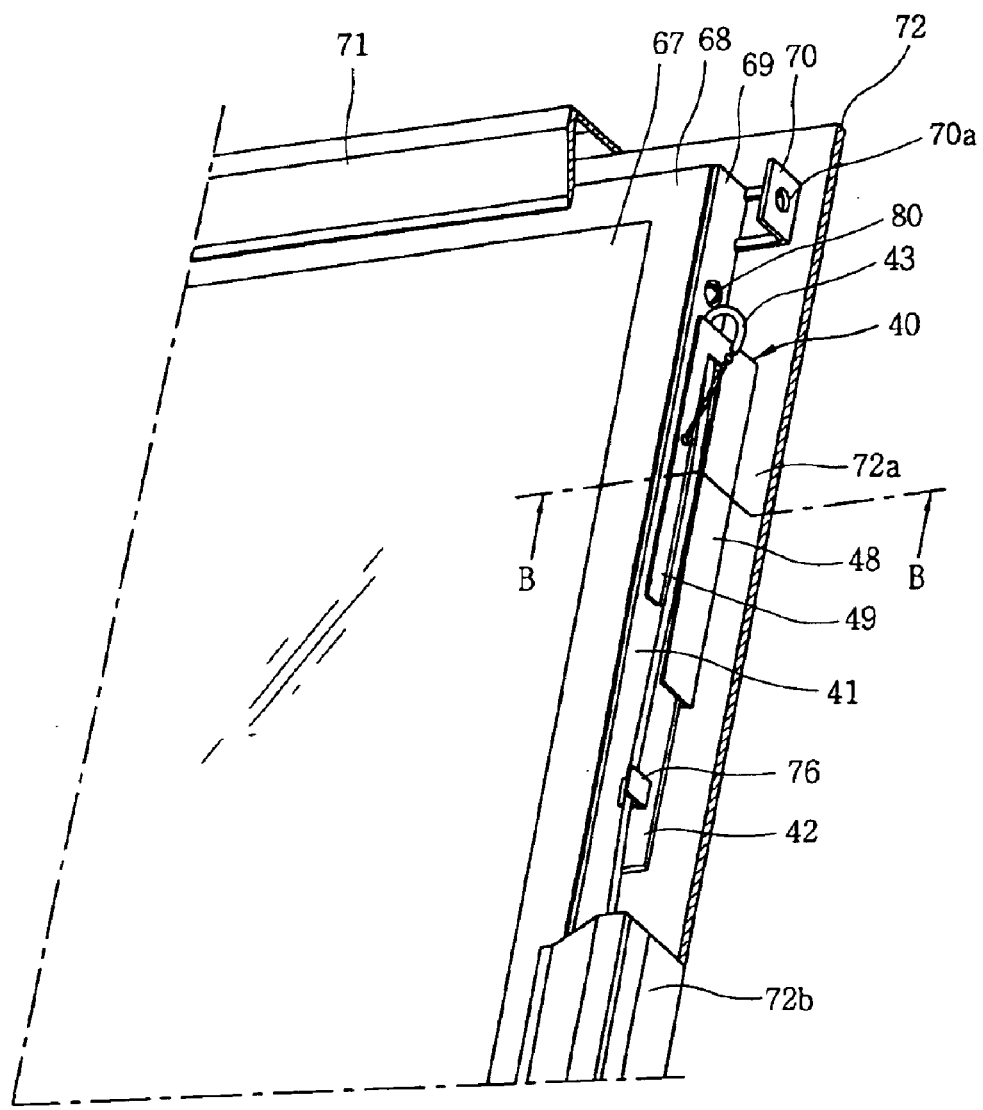
FIG. 6 is a cut perspective view showing how the antenna is assembled in a display case of the portable computer of FIG. 5 in accordance with the second embodiment of the present invention.
Figure 7:
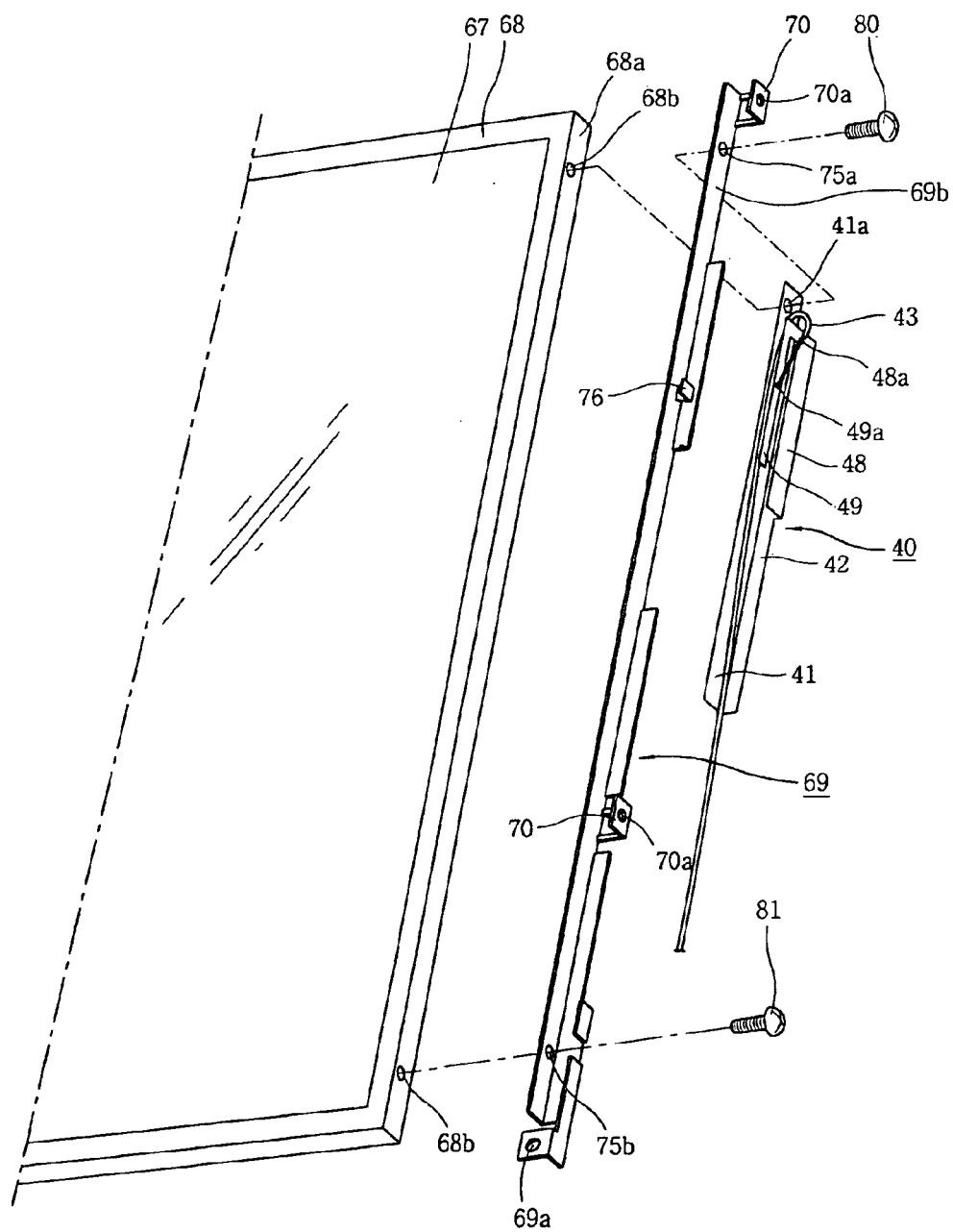
FIG. 7 is an exploded perspective view showing that the antenna is disassembled in the display case of the portable computer of FIG. 5 in accordance with the second embodiment of the present invention.

FIG. 6 is a cutaway perspective view showing how the antenna 40 is assembled in the display unit 62 of the portable computer 61 of FIG. 5 in accordance with the second embodiment of the present invention, and FIG. 7 is an exploded perspective view showing the antenna 40 disassembled from the display unit 62 of the portable computer 61 of FIG. 5 in accordance with the second embodiment of the present invention.

FIGS. 6 and 7 only show the right side of the display unit 62 for convenience, and the left side which is not shown is symmetrically the same as those of FIGS. 6 and 7.

The outer case 72 of the display unit 62 includes a bottom wall 72a and a side wall 72b extended perpendicularly from an edge portion of the bottom wall 72a, and a display panel 67 for displaying various information is positioned inside the outer case 72.

A panel frame 68 made of metal is installed at the circumferential face of the display panel 67, and as shown in FIG. 7, screw fixing holes 68b are formed in an upper and lower portion of a side wall 68a of the panel frame 68.

As the display panel 67 used for the portable computer 61 is enlarged to more than 14 inches, its weight is increased. Thus, a bracket 69 made of metal is provided to fix the display panel 67 to the outer case 72.

That is, the bracket 69 is closely contacted to the panel frame 68, at the both side faces of the display panel 67, and a lower end portion 69a of the bracket 69 is connected to the hinge unit 65 which rotatably couples the main body 63 of the portable computer 61 and the display unit 62.

The bracket 69 includes a plate portion 69b fixable to the side wall 68a of the panel frame 68, and the plate portion 69b includes an upper and lower hole 75a and 75b formed at positions corresponding to the screw fixing holes 68b.

The bracket 69 is formed long, having almost the same length as that of the side wall 68a of the panel frame 68, and fixing tabs 70 are formed protruded in an 'L' shape from an edge of the plate portion 69a.

Fixing tabs 70 respectively include a screw fixing hole 70a and so as to be fixedly engaged by a screws (not shown) to the outer case 72 of the display unit 62.

The antenna 40 of the portable computer 61 is formed in a manner that the grounding portion 41, the connecting portion 42, the cable fixing portion 48 and the transmitting and receiving portion 49 are successively bent.

The distance between the grounding portion 41 and the transmitting and receiving portion 49 of the antenna 40 is the same as or shorter than a protrusion length of the fixing portion 70 of the bracket 69. The length of the antenna 40 is the same as or shorter than the length of the panel frame 68 or the bracket 69.

A hole 41a is formed in one end of the grounding portion 41, through which a screw 80 can be inserted for fastening the antenna 40. Accordingly, the antenna 40 and the bracket 69 are fixed as the screws 80 and 81 are engaged at the side wall 68a of the panel frame 68.

The coaxial cable 43 connected from the LAN card (not shown), a communication control device, installed within the main body 63 of the portable computer 61 to the antenna 40 is wired between the cable fixing portion 48 and the bracket 69, and the end portions of its outer shield and center conductor are connected to the cable fixing portion 48 and the transmitting and receiving portion 49, respectively.

Figure 8:
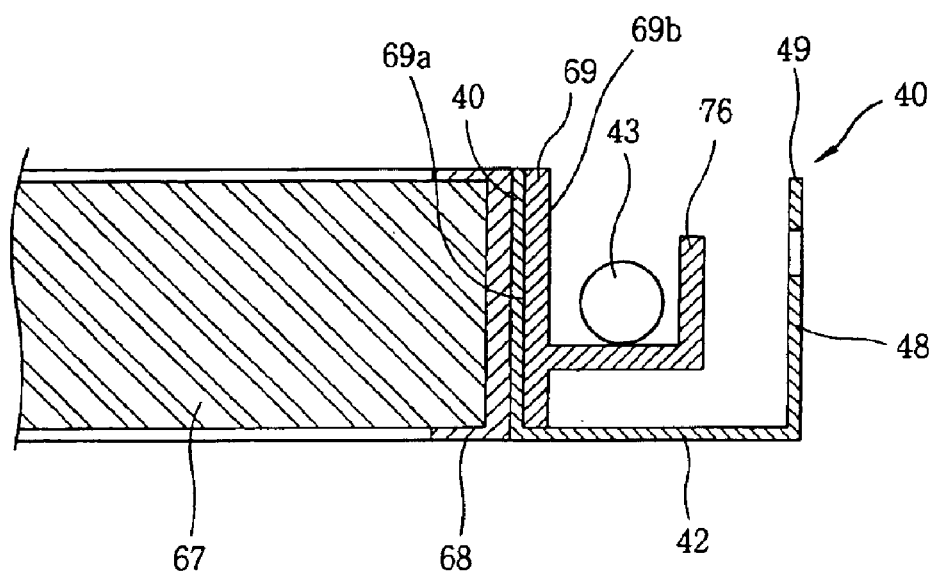
FIG. 8 is a sectional view showing an assembled state viewed in the direction of 'B—B' line of FIG. 6 in accordance with the second embodiment of the present invention.

FIG. 8 is a cross-sectional view showing an assembled state of the antenna in accordance with the second embodiment of the present invention viewed in the direction of line 'B—B' in FIG. 6.

A cable rack portion 76 is formed in an 'L' shape at an almost middle position of the bracket 69 and protruded toward the side wall 72b of the outer case 72. Accordingly, the cable 43 is stably positioned with its movement minimized by the cable rack portion 76 formed at the side of the bracket 69.

The process of assembling the display unit 62 having the internal antenna 40 in accordance with the second embodiment of the present invention will now be described with reference to FIGS. 5 through 8.

First, in a state that antenna 40 and bracket 69 are positioned along side the panel frame 68 so that the upper screw fixing hole 68b formed in the side wall 68a of the panel frame 68, the hole 41a formed through the grounding portion 41 of the antenna 40 and the upper hole 75a in the bracket 69 are aligned with each other, the screw 80 is engaged into the screw fixing hole 68b in the panel frame 68 through the upper hole 75a in the bracket 69 and the hole 41a in the antenna 40.

At this time, the grounding portion 41 of the antenna 40 is positioned between the side wall 68a of the panel frame 68 and the bracket 69, and put in contact with the side wall 68a of the panel frame 68 and the bracket 69.

Next, in a state that the lower screw fixing hole 68b formed in the side wall 68a of the panel frame 68 and the lower hole 75b in the bracket 69 are aligned, a screw 81 is engaged into the lower screw fixing hole 68b in the panel frame 68 through the hole 75b in the bracket 69, whereby, the lower portion of the bracket 69 is closely contacted and fixed to the panel frame 68.

And then, the bracket 69 fixed on the side wall 68a of the panel frame 68 is fixed into the outer case 72 of the display unit 62 using screws(not shown). That is, the screws are engaged into the outer case 72 of the display unit 62 through the screw fixing holes 70a of the bracket 69.

And then, the coaxial cable 43 is stably positioned with its movement minimized by the cable rack portion 76 formed at the side of the bracket 69.

Then, the inner case 71 is fixed onto the upper portion of the display panel 67 fixed in the outer case 72. At this time, the circumferential face of the inner case 71 is coupled to the side wall 72b of the outer case 72. Accordingly, the panel frame 68, the antenna 40 and the bracket 69 are positioned internally within the display unit 62 and are not visible from outside.

Especially, the antenna 40 is positioned internally at both sides of the display panel in the display unit 62.

In the above-described second embodiment, the grounding portion 41 of the antenna 40 is positioned between the panel frame 68 and the bracket 69. But, alternatively, the panel frame 68, the bracket 69 and the grounding portion 41 of the antenna 40 may be sequentially disposed and the bracket 69 and the grounding portion 41 may be fixed to the panel frame 68 with a screw.

In the second embodiment of the present invention, one screw 80 is used to fix the antenna 40 and the bracket 69 together to the side wall 68a of the panel frame 68. But, alternatively, after the antenna 40 is fixed to the bracket with a screw or by soldering, the bracket 69 may be fixed to the panel frame 68.

In addition, in the second embodiment of the present invention, although the bracket 69 is fixed to the side wall 72b of the outer case 72, even if the bracket 69 is fixed to the bottom wall 72a of the outer case 72 with screws, the antenna can still be fixed inside the display unit within the scope of the gist of the present invention.

Figure 9:
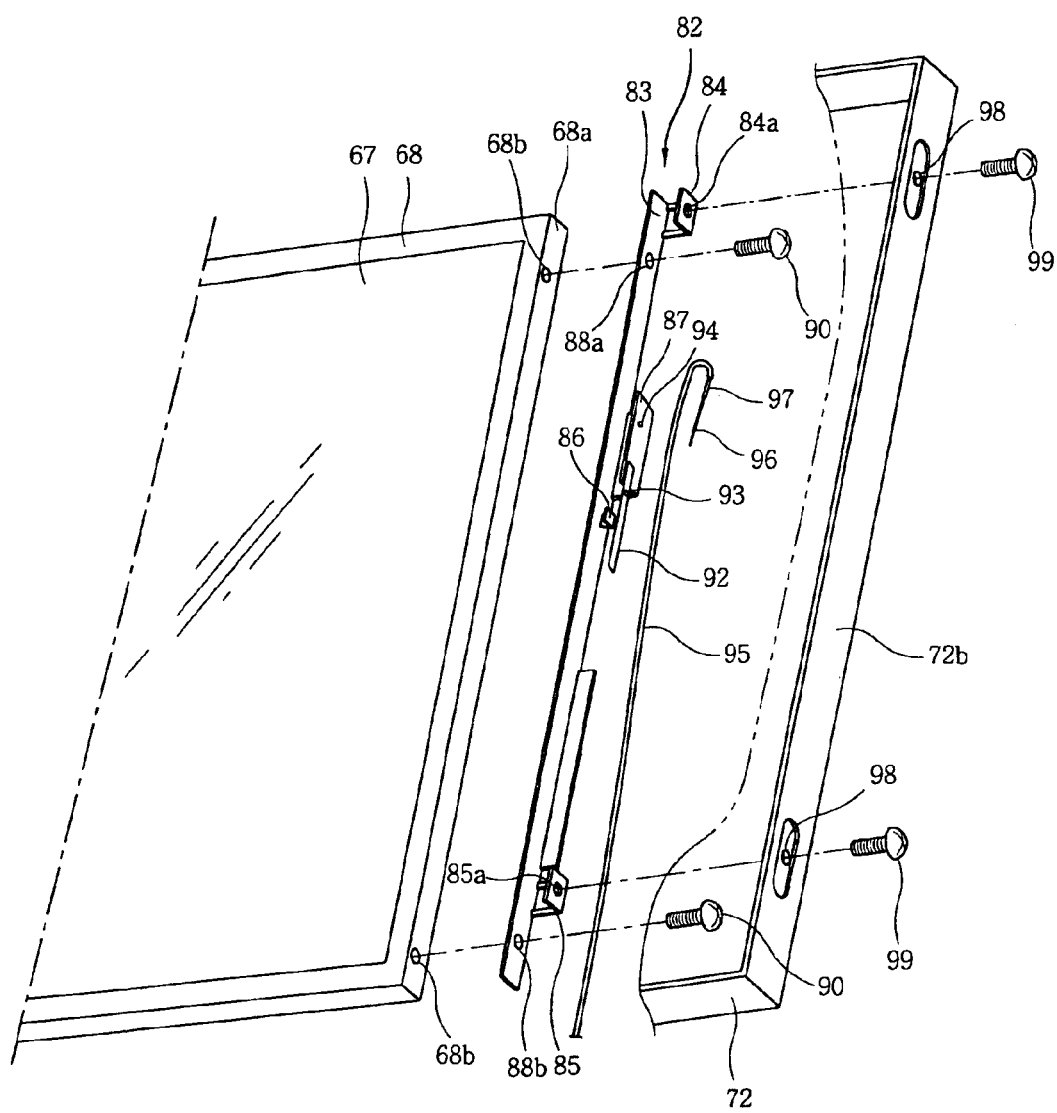
FIG. 9 is an exploded perspective view of a major part of the portable computer with an antenna in accordance with the third embodiment of the present invention.

FIG. 9 is an exploded perspective view of a major part of the portable computer 61 with an antenna in accordance with a third embodiment of the present invention.

The third embodiment of the present invention has a structure wherein the antenna is integrally formed with a bracket 82 for fixing a panel frame 68 to a display case.

The third embodiment of the present invention has the same structure as that of the second embodiment in the aspect that the panel frame 68 made of metal is fixed to a display panel 67 along the outer circumferential face of the display panel 67, and the screw fixing holes 68b are formed in the upper and the lower portions at the side wall 68a of the panel frame 68.

A metallic bracket 82 is provided to fix the display panel 67 and the panel frame 68 to an outer case 72.

The bracket 82 includes holes 88a and 88b formed at positions corresponding to the screw fixing holes 68b of the panel frame 68. Accordingly, the panel frame 68 and the bracket 82 are adhered and fixed mutually through the screws 90.

In other words, in a state that the holes 88a and 88b of the bracket 82 are aligned with the corresponding the screw fixing holes 68b formed at both portions of the panel frame 68 and the bracket 82 is fixed to the frame 68 with the screws 90, so that the bracket 82 can be thereby contacted and fixed to the panel frame 68.

The bracket 82 is formed long, having almost the same length as the length of the side wall 68a of the panel frame 68, and includes case fixing portions 84 and 85 which are extended from both end portions of a plate portion 83 thereof, and bent into an 'L' shape.

The case fixing portions 84 and 85 respectively include threaded screw fixing holes 84a and 85b which are engaged by screws 99 so as to be fixed to the inner side of the side walls 72b of the outer case 72 of the display unit 62.

Namely, the screws 99 are engaged into the screw fixing holes 84a and 85b of the upper and lower case fixing portions 84 and 85 through the holes 98 formed in the upper and lower portion of the side wall 72b of the lower case 72.

Especially, in the third embodiment of the present invention, an antenna fixing portion 87 is formed at the bracket 82 by being integrally extended therefrom.

That is, the antenna fixing portion 87 is positioned between the case fixing portions 84 and 85 of the bracket 82, and bent and extended as long as a predetermined length in an 'L' shape from the plate portion 83 of the bracket 82, and includes a connecting portion 94.

The length of the protrusion of the antenna fixing portion 87 from the plate portion 83 is shorter than that of the case fixing portions 84 and 85 from the plate portion 83.

An antenna 92 with a predetermined length is fixed at a face positioned in parallel with the plate portion 83 at one end of the antenna fixing portion 87.

The antenna 92 is made of phosphor bronze and fixed to the antenna fixing portion 87 by a soldering method or a screw fastening method, and includes a fixing portion 93.

A coaxial cable 95 is connected to the antenna 92 so as to transmit a transmission signal from the main body 63 of the portable computer 61 to the antenna 92 or transmit a signal received by the antenna 92 to the main body.

The coaxial cable 95 includes a center conductor wire 96 formed at a central portion thereof for transmitting a transmission and reception signal and an external grounding shield conductor wire 97 installed around the center conductor wire with an insulator therebetween.

The center conductor wire 96 is electrically connected to the fixing portion 93 of the antenna 92, and the grounding shield conductor wire 97 is electrically connected to the connecting portion 94 of the antenna fixing portion 87.

The coaxial cable 95 connected to the antenna 92 and the antenna fixing portion 87 is disposed to pass between the antenna fixing portion 87 and the plate portion 83 of the bracket 82, and a cable supporting portion 86 is protruded from the plate portion 83 of the bracket 82, as high as about the middle position from the bottom of the plate portion 83.

The process of assembling the display unit 62 having the antenna 92 in accordance with the third embodiment of the present invention will now be described with reference to FIG. 9.

First, in a state that the bracket 82 is positioned so that the upper and lower holes 88a, 88b in the bracket 82 are respectively aligned with the corresponding the upper screw fixing holes 68b formed at the side wall 68a of the panel frame 68, the screws 90 are engaged in the screw fixing holes 68b of the panel frame 68 through the upper and lower holes 88a, 88b of the bracket 82.

At this time, the plate portion 83 of the bracket 82 is thereby fixed and put in contact with the side wall 68a of the panel frame 68.

Next, the bracket 82 fixed on the side wall 68a of the panel frame 68 is fastened into the outer case 72 of the display unit 62 with the screws 99. That is, the screws 99 are engaged into the screw fixing holes 84a and 85b in the upper and lower case fixing portions 84 and 85 through the holes 98 formed at the upper and lower portion of the side wall 72b of the outer case 72, so that the bracket 82 is fixedly supported by the lower case 72.

And then, the cable 95 is stably positioned with its movement minimized by the cable supporting portion 86 formed at the side of the plate portion 83.

Then, the inner case 71 is fixed at the upper portion of the display panel 67 fixed in the outer case 72. At this time, the circumferential face of the inner case 71 is coupled to the side wall 72b of the outer case 72. Accordingly, the panel frame 68, the antenna 92 and the bracket 82 are positioned inside the display unit 62 and are not visible from outside.

Especially, the bracket 82 with the antenna 92 is positioned at both sides of the display panel in the display unit 62.

In the above-described third embodiment, the antenna 92 is integrally fixed at the bracket 82, so that the bracket 82 which supports the display panel 67 and the panel frame 68 can be easily fixed in the outer case 72. In addition, the grounding of the antenna 92 is made at the bracket 82 and the panel frame 68, so that the grounding area can be enlarged.

As so far described, the antenna of the mobile electronic equipment is positioned internally in the portable electronic equipment such as the PDA or the portable computer, and data transmission and reception is possibly performed for a radio communication without the antenna being exposed outwardly. Thus, the problem that the user must handle the antenna manually can be solved, and the antenna can be prevented from damage possibly caused due to a wrong use.

In addition, since the antenna is grounded by being closely contacted to the panel frame made of metal at the both sides of the display panel, the panel frame with a considerably wide area can be used as a grounding portion, and the antenna can thereby be effectively shielded from the electronic signals in the display unit, so that an efficiency of the data transmission and reception of the antenna can be heightened.

Moreover, when the user intends to use the portable computer by erect the display case upright, the antenna installed internally in the display case is accordingly erected. Accordingly, signal transmission and reception can be smoothly performed for a radio communication.

Furthermore, since the antenna which is thinner than the bracket is coupled to the bracket and installed, the antenna can be positioned within the display unit without increasing the width of the display unit.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A mobile electronic equipment with an internal antenna comprising:
   a case having an opened portion;
   a display panel exposed through the opened portion of the case for displaying text or images;
   an electrically conductive panel frame for supporting edges of the display panel, and being positioned within the case;
   an antenna fastened to the panel frame for enabling a radio communication, the antenna being grounded to the panel frame in a state of being inserted in the case, wherein the antenna comprises,
      a grounding portion in conductive contact to the panel frame,
      a cable fixing portion positioned substantially parallel with and spaced at a distance from the grounding portion, and
      a connecting portion connecting the grounding portion and the cable fixing portion, wherein the connecting portion is bent at an angle outwardly from and extended from an edge of the grounding portion and disposed outwardly from the grounding portion.

2. The equipment of claim 1, wherein the connecting portion is configured to be bent substantially perpendicular to and extended from a respective edge of each of the grounding portion and the cable fixing portion to connect the grounding portion and the cable fixing portion.

3. The equipment of claim 2, wherein the antenna is formed of a metal plate bent in a 'U' shape, and the grounding portion, the connecting portion and the cable fixing portion are integrally formed with one another.

4. The equipment of claim 2, wherein the cable fixing portion includes a transmitting and receiving portion extended long in a longitudinal direction of the antenna at one side thereof.

5. The equipment of claim 2, further comprising a coaxial cable with an outer shield conductor connected at one end thereof to the cable fixing portion and a center conductor thereof connected to a communication control device of the equipment.

6. The equipment of claim 5, wherein the coaxial cable is disposed to pass between the grounding portion and the cable fixing portion of the antenna.

7. The equipment of claim 5, wherein the cable fixing portion of the antenna includes a first junction portion where the center conductor of the coaxial cable is connected and a second junction portion where the outer shield of the coaxial cable is connected.

8. The equipment of claim 2, wherein a hole is formed at one end of the grounding portion, through which engaging members fix the antenna to the panel frame.

9. The equipment of claim 1, wherein the width of the antenna is the same as or the smaller than that of the panel frame.

10. The equipment of claim 1, wherein the length of the antenna is the same as or smaller than that of the panel frame.

11. The equipment of claim 1, wherein the panel frame includes a side wall formed to surround a side face of the display panel, and the antenna is put in contact with the side wall of the panel frame at the side face of the display panel.

12. The equipment of claim 1, wherein the case includes a radio communication control device electrically connected to the antenna and an input key which can be operated for inputting by a user.

13. The equipment of claim 1, further comprises a bracket for fixing the panel frame to the case, and the grounding portion of the antenna is inserted between the bracket and the panel frame.

14. The equipment of claim 13, wherein the antenna is mounted to the panel frame by a plurality of brackets at both sides of the display panel and grounded to the panel frame.

15. The equipment of claim 1, further comprising a bracket for fixing the panel frame to the case, the bracket being made of metal and installed to be closely adhered to the panel frame, and wherein the antenna is fixed at one side of the bracket.

16. The equipment of claim 15, wherein the bracket includes an antenna fixing portion protruded from a portion thereof closely adhered to the panel frame so that the antenna can be fixed.

17. The equipment of claim 16, wherein the antenna is formed in a plate shape and fixed to the bracket at the antenna fixing portion.

18. The equipment of claim 16, further comprising a coaxial cable with one end portion connected to the antenna and the antenna fixing portion and the other end portion connected to a communication control device.

19. The equipment of claim 18, wherein the bracket includes a cable supporting portion protruded from the portion thereof closely adhered to the panel frame, for supporting the coaxial cable.

20. The equipment of claim 1, further comprising a main body including a key board which can be operated by a user and a radio communication control device electrically connected to the antenna, and wherein the case is rotatably coupled so as to be folded to the main body or unfolded from the main body.

21. The equipment of claim 20, further comprising a bracket with one side thereof fixedly contacted with a side wall of the panel frame and another side thereof fixed at an inner wall of the case.

22. The equipment of claim 21, wherein the grounding portion of the antenna is disposed between the panel frame and the bracket.

23. The equipment of claim 21, wherein the panel frame includes a screw fixing hole, and the bracket and the antenna each include holes through which a screw may be inserted formed therein at positions thereof corresponding to the screw fixing hole of the panel frame, so that the bracket and the antenna may be fixed to the panel frame by the screw.

24. The equipment of claim 20, wherein the cable fixing portion includes a transmitting and receiving portion at one side thereof, extended in a longitudinal direction of the antenna.

25. The equipment of claim 24, further comprising a coaxial cable with one end connected to the cable fixing portion and the other end connected to the communication control device in the main body.

26. The equipment of claim 25, wherein the coaxial cable is installed to pass between the grounding portion and the cable fixing portion.

27. The equipment of claim 25, wherein the coaxial cable fixing portion includes a first junction portion where a center conductor wire of the coaxial cable is connected and a second junction portion where an outer shield of the coaxial cable is connected.

28. The equipment of claim 20, further comprising a bracket for fixing the panel frame to the case, the bracket being made of metal and installed to be closely adhered to the panel frame, and wherein the antenna is fixed at one side of the bracket.

29. The equipment of claim 28, wherein the bracket includes an antenna fixing portion protruded from a portion thereof closely adhered to the panel frame so that the antenna can be fixed thereto.

30. The equipment of claim 29, wherein the antenna is formed in a plate shape and fixed at the antenna fixing portion.

31. The equipment of claim 29, further comprising a coaxial cable with one end connected to the communication control device in the main body and the other end connected to the antenna, so as to transmit a transmission or reception signal between the communication control device and the antenna.

32. The equipment of claim 31, wherein the bracket includes a cable supporting portion protruded from a portion thereof closely adhered to the panel frame, for supporting the cable.

33. The equipment of claim 1, wherein the antenna is formed of a metal plate bent in a 'U' shape and includes the grounding portion, the connecting portion and the cable fixing portion each configured to extend in different two-dimensional planes.

34. A mobile electronic equipment comprising:
a main body including a main lower case on which a key board is positioned, a printed circuit board installed at the main lower case and connected to a communication control device, and an upper case coupled to the main lower case;
a display unit supported by the main body to be rotatable between a first position where the key board is covered and a second position where the key board is uncovered, the display unit comprising:
a cover outer case constituting a cover of the display unit and having a bottom wall and a side wall;
a display panel mounted at the cover outer case and having a panel frame installed at edges thereof, the panel frame having a side wall;
a bracket with one side thereof fixedly connected with a lateral edge of the panel frame of the display panel and with a fixing portion fixed to the side wall of the cover outer case formed at another side thereof; and
an antenna having a grounding portion and a transmitting and receiving portion, the grounding portion being fixedly connected with the bracket and, wherein the antenna further comprises,
a connecting portion bent perpendicularly and extended from an edge of the grounding portion and disposed outwardly of the bracket, and
a cable fixing portion perpendicularly bent at an edge of the connecting portion,
wherein the transmitting and receiving portion is extended longitudinally at one edge of the cable fixing portion.

35. The equipment of claim 34, wherein a pair of antennas are installed, one at each side of the display panel.

36. The equipment of claim 34, wherein the panel frame includes a screw fixing hole being formed at a side wall of the panel frame, and holes are respectively formed at the bracket and the grounding portion of the antenna corresponding to the screw fixing hole, whereby a screw can be passed the screw fixing hole and the holes of the bracket and the grounding portion simultaneously to fix the bracket and the antenna to the panel frame.

37. The equipment of claim 34, further comprising a coaxial cable with one end connected to the transmitting and receiving portion and the other end connected to the communication control device, and wherein the cable is passed between the grounding portion and the transmitting and receiving portion of the antenna.

38. The equipment of claim 34, further comprising a coaxial cable with one end connected to the transmitting and receiving portion and the other end connected to the communication control device, wherein the cable is passed between the grounding portion and the transmitting and receiving portion of the antenna, and wherein the grounding portion is an integral part of the bracket or passes between the bracket and the side wall of the panel frame.

39. A mobile electronic equipment having a main body which contains a communication control device and a display unit with a display panel supported by a panel frame made of metal, the equipment comprising:

an outer case having a bottom wall supporting the display panel and perpendicularly a side wall at an edge of the bottom wall to surround the display panel;

a bracket fixed to the panel frame to support the display panel, with which bracket a case fixing portion is integrally formed for fixing at the outer case;

an antenna fixed at an antenna fixing portion formed at the bracket for transmitting and receiving a signal to and from an external source; and a coaxial cable with one end connected to the communication control device and the other connected to the antenna, for transmitting a transmission and a reception signal between the communication control device and the antenna, and wherein the antenna further comprises, a connecting portion bent perpendicularly and extended from an edge of the antenna fixing portion and disposed outwardly of the bracket, and a cable fixing portion perpendicularly bent at an edge of the connecting portion, wherein the transmitting and receiving portion is extended longitudinally from the cable fixing portion.

40. The equipment of claim 39, wherein the bracket includes a cable supporting portion for supporting the coaxial cable.

41. The equipment of claim 39, wherein the coaxial cable is electrically connected to the antenna and the antenna fixing portion.

42. A mobile electronic equipment comprising:

a main body including a main lower case on which a key board is positioned, a printed circuit board installed at the main lower case and connected to a communication control circuit, and an upper case coupled to the main lower case;

a display unit supported by the main body to be rotatable between a first position where the key board is covered and a second position where the key board is uncovered, the display unit comprising:

a cover outer case constituting a cover of the display unit and having a bottom wall and a side wall;

a display panel mounted in the cover outer case and having a panel frame installed at edges thereof, the panel frame having a side wall;

a bracket configured to extend inwardly from the side wall of the cover outer case with a fixing portion at one side thereof fixedly connected with the side wall of the panel frame;

an antenna fixed at the fixing portion of the bracket configured to extend between the fixing portion and the side wall of the cover outer case for enabling a radio communication, the antenna configured to be grounded to the panel frame; and a coaxial cable with one end connected thereto to the communication control circuit and another end thereof connected to the antenna, so as to transmit a transmission and a reception signal between the communication control device and the antenna.

43. The mobile electronic equipment of claim 42, wherein the antenna further comprises:

a grounding portion coupled to the fixing portion of the bracket;

a connecting portion bent perpendicularly and extended from an edge of the grounding portion and disposed outwardly of the bracket; and a cable fixing portion perpendicularly bent at an edge of the connecting portion;

wherein the transmitting and receiving portion is extended longitudinally at one edge of the cable fixing portion.

44. An antenna for radio communication installed in mobile electronic equipment, comprising:

a grounding portion grounded to a metal member in the mobile electronic equipment;

a cable fixing portion formed in spaced parallel relation to the grounding portion, an end of a coaxial cable connected to a communication control device of the mobile electronic equipment being electrically connected thereto; and a connecting portion configured to be bent substantially perpendicular to and extended from a respective edge of each of the grounding portion and the cable fixing portion to connect the grounding portion and the cable fixing portion.

45. The antenna of claim 44, wherein the antenna is formed of a metal plate bent in a 'U' shape and includes the grounding portion, the connecting portion and the cable fixing portion which are integrally formed with one another.

46. The antenna of claim 44, wherein the cable fixing portion includes a transmitting and receiving portion extended from one edge thereof in a longitudinal direction of the antenna, and wherein the antenna is formed of a metal plate bent in a 'U' shape and includes the grounding portion, the connecting portion and the cable fixing portion each configured to extend in different two-dimensional planes.

47. The antenna of claim 44, wherein the cable fixing portion includes portions for connecting to a center conductor and an outer shield of the coaxial cable.

48. A mobile electronic equipment with an internal antenna comprising:

a case having an opened portion;

a display panel exposed through the opened portion of the case for displaying text or images;

an electrically conductive panel frame for supporting edges of the display panel, and being positioned within the case;

an antenna fastened to the panel frame for enabling a radio communication, the antenna being grounded to the panel frame in a state of being inserted in the case;

a bracket for fixing the panel frame to the case, the bracket being made of metal and installed to be closely adhered to the panel frame, and wherein the antenna is fixed at one side of the bracket, wherein the bracket includes an antenna fixing portion protruded from a portion thereof closely adhered to the panel frame so that the antenna can be fixed; and a coaxial cable with one end portion connected to the antenna and the antenna fixing portion and the other end portion connected to a communication control device.

* * * * *

UNITED STATES PATENT AND TRADEMARK OFFICE
CERTIFICATE OF CORRECTION

PATENT NO. : 6,957,085 B2 Page 1 of 1
APPLICATION NO. : 10/036545
DATED : October 18, 2005
INVENTOR(S) : Hyo Sik Shin, Kwang Seog Bang and Eung Bok Kim It is certified that error appears in the above-identified patent and that said Letters Patent is hereby corrected as shown below:

On the Title Page (73):
Please add the Assignee as follows:

(73)   Assignee:   LGEELECTRONICS INC., Seoul (KR)

Signed and Sealed this

Fourth Day of December, 2007

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 6,957,085 B2 |
| APPLICATION NO. | : 10/036545 |
| DATED | : October 18, 2005 |
| INVENTOR(S) | : Hyo Sik Shin, Kwang Seog Bang and Eung Bok Kim |

Page 1 of 1

It is certified that error appears in the above-identified patent and that said Letters Patent is hereby corrected as shown below:

On the Title Page, Item 73 Assignee should read -- (73) LG ELECTRONICS INC., Seoul (KR) --.

Signed and Sealed this

Sixth Day of May, 2008

JON W. DUDAS
*Director of the United States Patent and Trademark Office*